United States Patent [19]

Nicholson et al.

[11] Patent Number: 4,511,613

[45] Date of Patent: Apr. 16, 1985

[54] METHOD FOR INHIBITING DISCOLORATION ON CELLULOSE FOOD CASINGS

[75] Inventors: Myron D. Nicholson, Lockport; Herman S. Chiu, Chicago, both of Ill.

[73] Assignee: Union Carbide Corporation, Danbury, Conn.

[21] Appl. No.: 625,364

[22] Filed: Jun. 27, 1984

Related U.S. Application Data

[62] Division of Ser. No. 466,302, Feb. 14, 1983.

[51] Int. Cl.³ ................... A22C 13/00; F16L 11/00
[52] U.S. Cl. .................. 428/36; 138/118.1; 426/135; 427/230; 427/324; 427/443.1
[58] Field of Search ........... 426/105, 129, 135; 138/118.1; 428/36; 427/230, 236, 237, 248.1, 255.6, 324, 337, 427, 439, 443.1

[56] References Cited

U.S. PATENT DOCUMENTS

| Re. 28,281 | 12/1974 | Bridgeford . | |
|---|---|---|---|
| 2,819,488 | 1/1958 | Gimbel | 17/42 |
| 2,901,358 | 8/1959 | Underwood et al. | 138/118.1 |
| 2,983,949 | 5/1961 | Matecki | 17/42 |
| 2,984,574 | 5/1961 | Matecki | 17/42 |
| 3,097,393 | 7/1963 | Matecki | 17/42 |
| 3,110,058 | 11/1963 | Marbach | 17/42 |
| 3,316,189 | 4/1967 | Adams | 428/436 |
| 3,330,669 | 7/1967 | Hollenbeck . | |
| 3,378,379 | 4/1968 | Shiner et al. | 17/42 |
| 3,408,916 | 11/1968 | Cohly et al. . | |
| 3,451,827 | 6/1969 | Bridgeford | 138/118.1 |
| 3,467,527 | 9/1969 | Wistreich . | |
| 3,533,809 | 10/1970 | Cohly et al. . | |
| 3,898,348 | 8/1975 | Chiu et al. | 426/413 |
| 3,905,397 | 9/1975 | Chiu | 138/118.1 |
| 3,930,036 | 12/1975 | Burke | 426/140 |
| 4,104,408 | 8/1978 | Chiu | 426/135 |
| 4,278,694 | 7/1981 | Chiu | 426/135 |
| 4,356,218 | 10/1982 | Chiu et al. | 427/355 |
| 4,377,187 | 3/1983 | Chiu | 138/118.1 |
| 4,377,606 | 3/1983 | Chiu | 138/118.1 |

Primary Examiner—Arthur L. Corbin
Attorney, Agent, or Firm—John C. LeFever; Real J. Grandmaison

[57] ABSTRACT

A process and composition for inhibiting discoloration and the formation of black spots upon a cellulose food casing treated with a liquid smoke solution derived from natural wood and containing smoke color, odor and flavor constituents, comprising contacting the food casing with an agent having the ability to prevent the progressive oxidation of metals.

32 Claims, 13 Drawing Figures

METHOD FOR INHIBITING DISCOLORATION ON CELLULOSE FOOD CASINGS

This application is a division of prior U.S. application Ser. No. 466,302 filed Feb. 14, 1983.

BACKGROUND OF THE INVENTION

1. Field of the Invention

This invention relates to liquid smoke-containing food casings, and more particularly, to cellulose casings which have been treated so as to inhibit the formation of black spots on the liquid smoke-containing cellulose casings.

2. Description of the Prior Art

Surface appearance, odor and flavor are important factors in the commercial and consumer acceptance of processed meat products, and a common feature of most varieties of such products involves the use of "smoking" for imparting characteristic flavor, odor and color thereto. The "smoking" of food products has been generally accomplished by subjecting the food product to actual contact with smoke in a gaseous or cloud-like form. Such "smoking" processes, however, have not been considered completely satisfactory for a variety of reasons, including the inefficiencies and lack of uniformity of the "smoking" operation. Because of the shortcomings experienced, many meat packers now employ various types of aqueous solutions of wood-derived smoke constituents, commonly called "liquid smoke solutions", in the processing of many types of meat and other food products.

The application of "liquid smoke solutions" to meat products is generally carried out in a variety of ways, including spraying or dipping an encased food product during the processing thereof, but this is not completely satisfactory because of inability to uniformly treat the encased product. Another method is to incorporate the liquid smoke solution in the recipe itself, but this does not always provide the desired surface appearance because of dilution of smoke ingredients. Also, incorporation of liquid smoke in the recipe reduces the stability of the meat emulsion, and will adversely affect taste if high concentrations are used. Spray or dip application of liquid smoke to encased food products also causes unwanted pollution and equipment corrosion problems for the food processor. In addition, encased foodstuffs treated by application of the liquid smoke during commercial processing have been found to yield sausages which are lacking in smoke color uniformity between different sausages from the same processed group. Even more undesirable is the lack of color uniformity which often appears on the surface of the same sausage, such as light and dark streaks or blotches, and even uncolored spots, particularly at the sausage ends.

It has been found that casings affording special treatment or structural characteristics to the food product can be more uniformly and economically supplied by the casing manufacturer. Accordingly, it would be desirable for the casing manufacturer to provide a liquid smoke-impregnated casing which could be used by the food processor to impart smoke flavor, odor and color to the food product after stuffing in the casing and during the elevated temperature processing of the encased product.

Liquid smoke often is a solution of natural wood smoke constituents prepared by burning a wood, for example, hickory or maple, and capturing the natural smoke constituents in a liquid medium such as water. Alternatively, the liquid smoke to be used may be derived from the destructive distillation of wood, that is, the breakdown or cracking of the wood fibers into various compounds which are distilled out of the wood char residue. Aqueous liquid smokes are generally very acidic, usually having a pH of 2.5 or less and a titratable acidity of at least 3%.

Reference to the term "smoke color, odor and flavor constituents", as used throughout this specification with respect to liquid smoke compositions and the liquid smoke-impregnated casing article of this invention, is intended to refer to, and should be understood as referring to, the smoke coloring and flavoring and odor constituents derived from liquid smoke solutions in their commercially available form.

The liquid smoke used to prepare the article of this invention is derived from natural wood smoke constituents. The source liquid smoke is generally produced by the limited burning of hardwoods and the absorption of the smoke so generated, into an aqueous solution under controlled conditions. The limited burning keeps some of the undesirable hydrocarbon compounds or tars in an insoluble form, thereby allowing removal of these constituents from the final liquid smoke. Thus, by this procedure, the wood constituents previously considered desirable by the manufacturer of the liquid smoke are absorbed into the solution in a balanced proportion and the undesirable constituents may be removed. The resultant liquid smoke solution still contains a significant concentration of tars, because the manufacturers and users of the liquid smoke consider the dark colored tars to be necessary from the standpoint of imparting smoke color, odor and flavor to foodstuffs.

Smoke treatment is quite expensive, and it has been assumed in the meat packing industry that to achieve the darker smoke color characteristic on the surface of a meat product, the encased meat product must be subjected to a more extensive treatment with smoke. This has typically been accomplished by increasing the treatment temperature, the contacting time, or the concentration of the liquid smoke, all of which result in increasing processing cost.

Food casings that are suitable for use in the present invention are tubular casings, and preferably tubular cellulosic casings, that are prepared by any one of the methods well known in the art. Such casings are generally flexible, thin-walled seamless tubing formed of regenerated cellulose, cellulose ethers such as hydroxyethyl cellulose, and the like, in a variety of diameters. Also suitable are tubular cellulosic casings having a fibrous reinforcing web embedded in the wall thereof, which are commonly called "fibrous food casings", as well as cellulosic casings without the fibrous reinforcement, herein referred to as "non-fibrous" cellulosic casings.

Casings conventionally known as "dry stock casings" may be used in the practice of this invention. Such casings generally have a water content within the range of from about 5 to about 14 weight percent of water if non-fibrous casing, or within the range of from about 3 to about 8 weight percent of water if fibrous casing, based on the total weight of casing including water.

Casings conventionally known as "gel stock casings" are casings which have higher moisture contents since they have not been previously dried, and such casings may also be used in the practice of this invention. Gel stock casings include fibrous or non-fibrous casings.

In the preparation and use of cellulosic food casings, the moisture content of the casings is of considerable importance. By way of non-limiting illustration, the casings may be shirred, i.e., compressed into a tightly compacted and pleated form, for use on a stuffing machine which deshirrs the shirred casing "stick" as the machine stuffs the deshirred casing. To facilitate shirring operations on fibrous cellulosic food casings without damaging them, it is generally necessary that they be of a water content in the range of from about 11% to about 26% by weight of total casing. To permit shirred casing to be stuffed without breaking the casing during the stuffing operation, shirred fibrous casings having an average moisture content of between about 17% to about 35% are required. This lower limit of moisture content is important during stuffing, because excessive breakage of the casing has been found to occur at lower moisture contents.

Here it is of importance to note that the term "moisture content" as used throughout this specification and in the appended claims with reference to the liquid smoke smoke-impregnated cellulosic casing articles of the invention, is intended to refer to and should, unless otherwise specified, be understood as referring to: the weight percent of water or moisture in the casing based on the total weight of the casing.

Even if large size casings are to be used in the flattened form for stuffing without conversion to the shirred stick form, such large size casings are quite stiff in the dry stock form, and are softened for stuffing operation by soaking in water, usually for about an hour, typically resulting in full moisture saturation of the casing to about 60% by weight of the total casing. Because of this full saturation soaking just prior to use in stuffing operations, the furnishing of such flat stock casings with any predetermined controllably added moisture content for stuffing operations has not been necessary or even advantageous.

The recent wider use of automatic high speed high pressure stuffing equipment for products employing large size tubular food casings, and the consequent increased demand for such casings in shirred form as compared to the short, flattened lengths heretofore used, has brought focus to bear on and has emphasized the problems of moisturizing such casings by soaking just prior to use. Moreover, the need for greater control of all aspects of the manufacture and use of large size food casings has been and is increasing. For example, the uniformity of dimensions of stuffed food casings and food products processed therein has become an increasingly important commercial requirement, and casing moisture content has been found to be a factor in control of uniformity, as well as in meeting the continuing need to readily, and economically stuff the casings without damage or breakage thereof and, more importantly, to permit the stuffing of a given casing to its manufacturer's recommended fully stuffed size with consistent accuracy and reproducibility of results (size uniformity).

However, it has been found that liquid smoke-treated shirred cellulosic nonfibrous food casings, i.e., those without fiber reinforcement, having a relatively high moisture content develop dark discolorations upon storage. The dark discolorations are aptly termed "black spots". These black spots in time, for example, after about three months, represent a weakened area in the food casings which is susceptible to pinholing under stress and breakage during stuffing. It has been found that the areas of the black spots are contaminated with higher levels of iron compared to the clear areas of the casings. In the black spot areas of the casings, film deterioration may be experienced in a variety of stages from no visible damage, to blister separations, to actual holes. In addition, it has been observed that the black spots on the casings occasionally transfer to the food emulsion, thereby affecting the aesthetic character of the food product.

Further, there have been found to be two main types of black spots, intense and diffuse. Intense black spots are darker and more concentrated, and are often associated with a particle of foreign material which appears to seed the discoloration. The diffuse type of black spot has no intense color center, but appears as a general discoloration of the casing in a particular area thereof. Analysis of the intense black spot areas indicate high iron concentrations in the immediate area of the spot. In comparison, analysis of diffuse discolored areas show very slight increased iron concentration.

It has been found in water burst and stuffing performance tests that the casing degrades in the area of the black spot after about three months of storage so as to cause the potential for breakage, either during casing storage or subsequently during stuffing. Also, while the black spots are visible in high moisture content fibrous casings, breakage is not as prevalent as in non-fibrous casing due to the inherent strength provided by the fibrous reinforcing web.

Various attempts have been made to prevent black spot formation upon liquid smoke treated food casings. These attempts have included better housekeeping, using cleaning devices for the various machinery process steps such as during the casing shirring step, and cleaning the glycerine addition via submicron filtration. These attempts to avoid or minimize iron contamination have provided improvements in reducing black spot formation on liquid smoke treated casings during storage, but they have not provided completely satisfactory results, such as totally eliminating their formation. Thus, there is a continuing need for a process and a composition to prevent the formation of black spots on liquid smoke treated food casings and to overcome the above-noted disadvantages.

SUMMARY OF THE INVENTION

In accordance with the present invention, there is provided a process and a composition for inhibiting discoloration and the formation of black spots upon liquid smoke treated food casings which comprises the incorporation with said casings of an agent having the ability to prevent the progressive oxidation of metals. For example, iron is readily oxidized to the ferric state. However, in one aspect of this invention a metal such as iron in the form of ferric ion, $Fe^{+3}$, may be rendered unreactive to the compounds present in the liquid smoke by a number of reducing agents such as hydrogen sulfide, sulfur dioxide, and sodium hydrosulfite.

In another embodiment of this invention, a metal such as ferric ion, $Fe^{+3}$, may be rendered unreactive to the compounds present in the liquid smoke treated casings by forming insoluble metal complexes through combination with agents such as phosphates, polycarboxylic acids and their salts, and amines and their salts. The insoluble metal complexes formed at least partially encapsulate or encrust the metal particles, and further oxidation of the metals is thereby terminated. We have found that the insoluble metal complexes formed provide a barrier layer between the metal particle and the casing thereby protecting the casing from the oxidation effects of the metal.

More specifically, we have found that inhibition of the formation of black spots and discoloration upon liquid smoke treated food casings may be provided by the addition thereto of a coordination compound selected from the group consisting of chelating agents and sequestering agents. Coordination or complex compounds have the ability to combine with metals, metal ions and some nonmetallic ions to form stable complexes. We have found that chelating agents may be employed herein for the inactivation of metal ions, and for the repression of catalytic reactions such as between ferric ions and the phenolic constituents of liquid smoke compositions. Chelating agents may be generally divided into two classes depending on whether they form water-soluble chelates or whether they form chelates which precipitate. The former are usually called sequestering agents and are employed when the presence of free or hydrated metal ions is considered objectionable. Generally, effective removal of the metal requires that the stability constant of the metal chelate be large, i.e., that the concentration of metal ions in equilibrium with the chelating agent be very small. Thus, the compounds capable of binding metal ions so that they no longer exhibit their normal reactions in the presence of precipitating agents are known as sequestering agents or sequestrants.

We have found that not all sequestering and chelating agents are effective in our invention. Commercially available sequestering and chelating agents are generally classified as either organic material or inorganic material. The condensed polyphosphates are the most widely used of the inorganic sequestering and chelating agents. Typical condensed phosphates suitable for use in our invention include pyrophosphates, metaphosphates such as hexametaphosphate, and tripolyphosphates. Of the organic sequestering and chelating agents suitable for use in our invention, the amino polycarboxylic acids and their salts, such as ethylenediaminetetraacetic acid (EDTA) and diethylenetriaminepentaacetic acid, and the hydroxy carboxylic acids and their salts, such as citric acid and tartaric acid, have particular value herein. Other nitrogen-containing carboxylic acids such as nitrilotriacetic acid may be used as a sequestering agent, but its metal chelates are less stable than those of EDTA.

DETAILED DESCRIPTION OF THE INVENTION

Figure 1:
FIG. 1 is a photomicrographic view of a casing wall magnified 200 times.
Figure 2:
FIG. 2 is a photomicrographic view of a section of the casing wall of FIG. 1 magnified 2000 times.

With reference to the photomicrographic view of FIG. 1 to FIG. 4d, these photomicrographic views show varying degrees of casing wall deterioration under an iron particle which is found primarily in the center of a black spot. In FIG. 1, no casing wall deterioration is apparent and the film continuity has not been damaged. From FIG. 2, the initial stages of casing deterioration are visible. Specifically, the cracks or fissures indicate the film continuity has been broken, and casing weakness will result. As earlier indicated, FIG. 2 is a view of the casing wall of FIG. 1 magnified 2000 times.

Figure 3A:
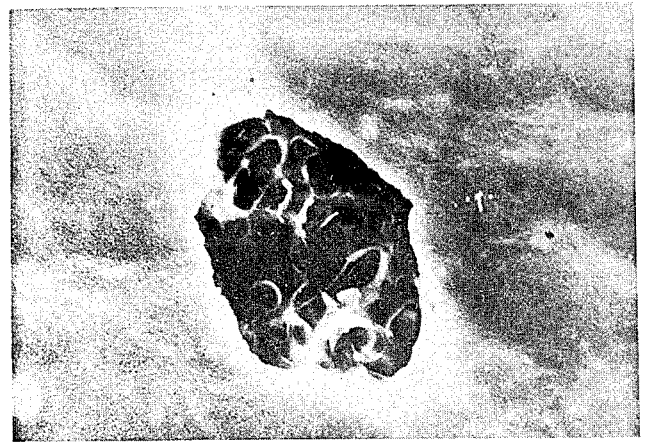
FIG. 3a is a photomicrographic view of a section of the casing wall of FIG. 1 magnified 4000 times.
Figure 3B:
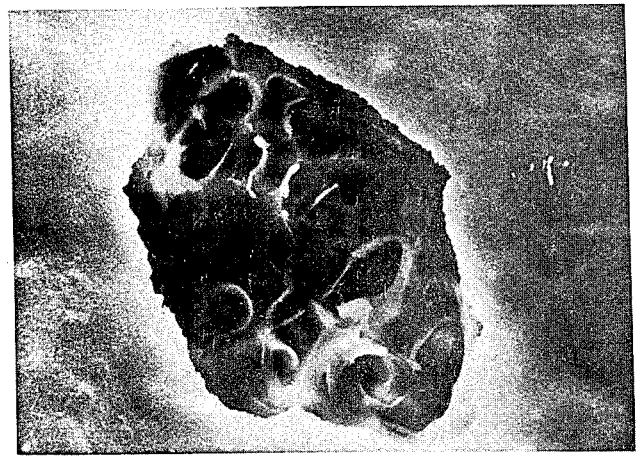
FIG. 3b is a photomicrographic view of the section of the casing wall of FIG. 3a magnified 6000 times.
Figure 4A:
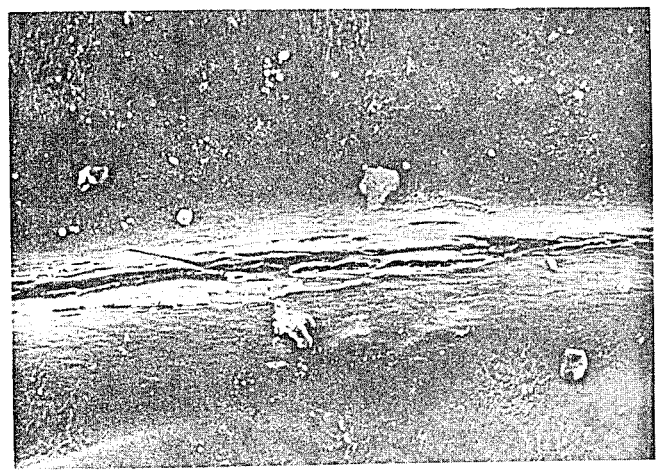
FIG. 4a is a photomicrographic view of a section of the casing wall of FIG. 1 magnified 200 times.
Figure 4B:
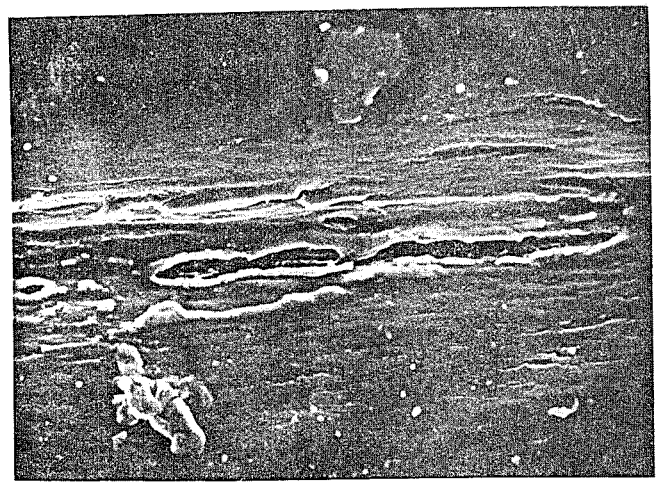
FIG. 4b is a photomicrographic view of the section of the casing wall of FIG. 4a magnified 480 times.
Figure 4C:
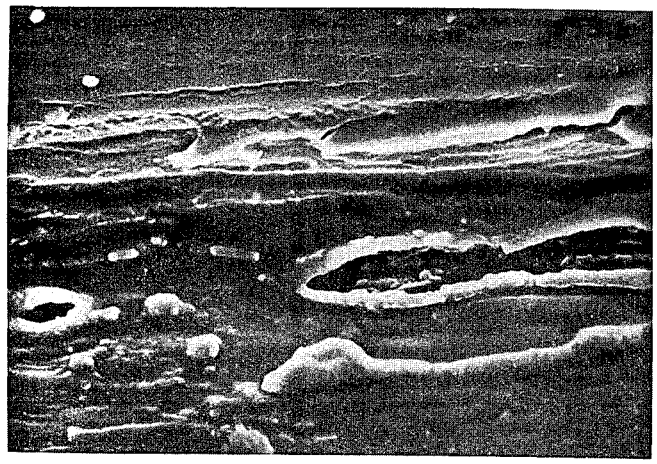
FIG. 4c is a photomicrographic view of the section of the casing wall of FIG. 4a magnified 1000 times.
Figure 4D:
FIG. 4d is a photomicrographic view of the section of the casing wall of FIG. 4a magnified 2000 times.

FIG. 3a and FIG. 3b are photomicrographic views of a section of the casing wall of FIG. 1 magnified 4000 times, and 6000 times, respectively. In FIG. 3a and FIG. 3b, casing wall deterioration is clearly apparent as evidenced by the absence of the external layer of the casing wall apparently having been destroyed during the discoloration reaction exposing the spongy interior structure of the casing.

FIG. 4a, FIG. 4b, FIG. 4c and FIG. 4d are photomicrographic views of a section of the casing wall of FIG. 1 magnified 200 times, 480 times, 1000 times, and 2000, times, respectively. Casing wall deterioration is progressively apparent from these figures wherein the external layer of the casing wall has apparently been destroyed, exposing the inner spongy structure of the casing.

Figure 5:
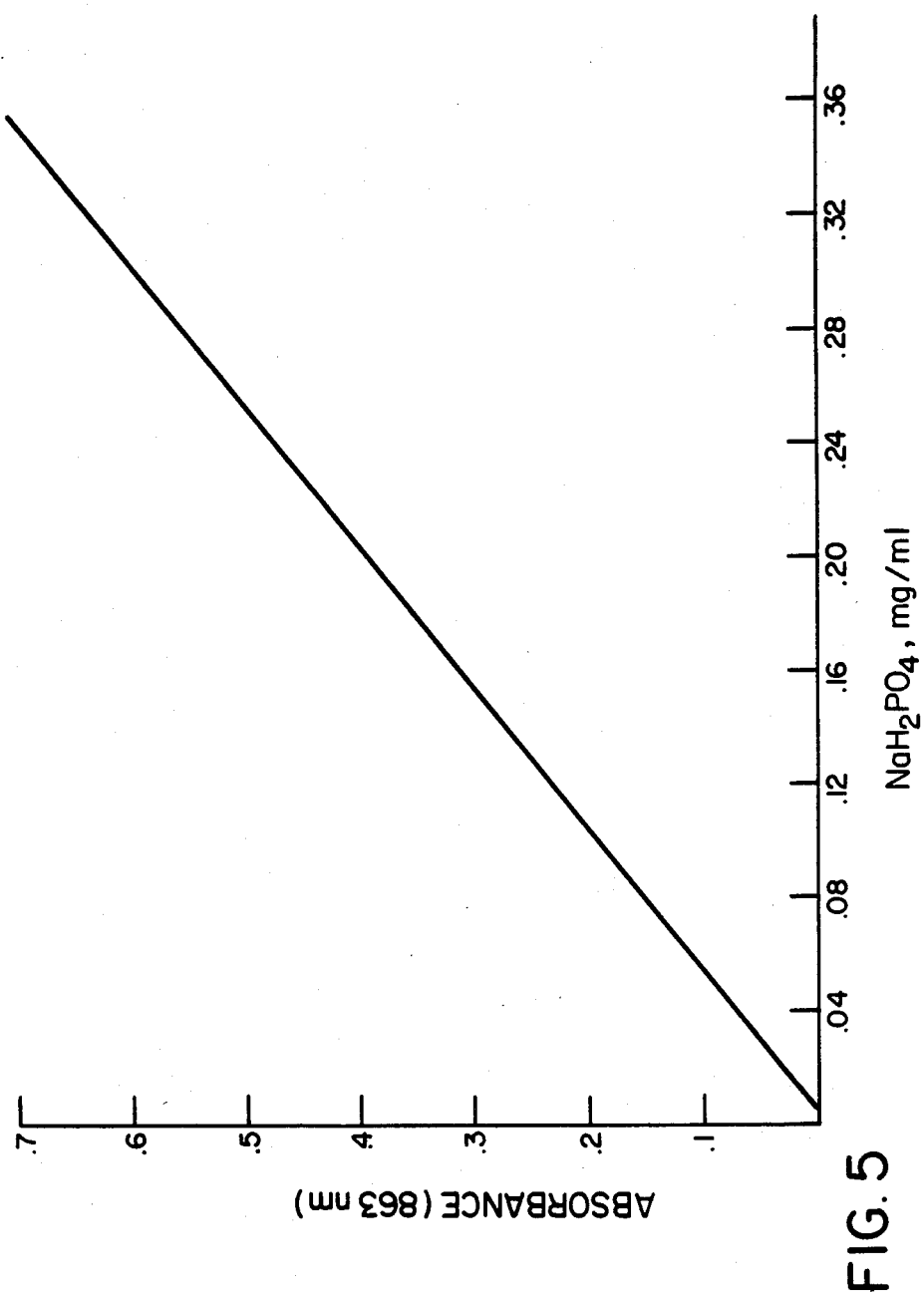
FIG. 5 depicts a standard absorbance curve for the determination of phosphate content on cellulose casings.

FIG. 5 is further discussed herein in conjunction with the examples.

Figure 6:
FIG. 6 is a photomicrographic view of a section of a casing wall magnified 500 times depicting an iron particle theron.
Figure 7:
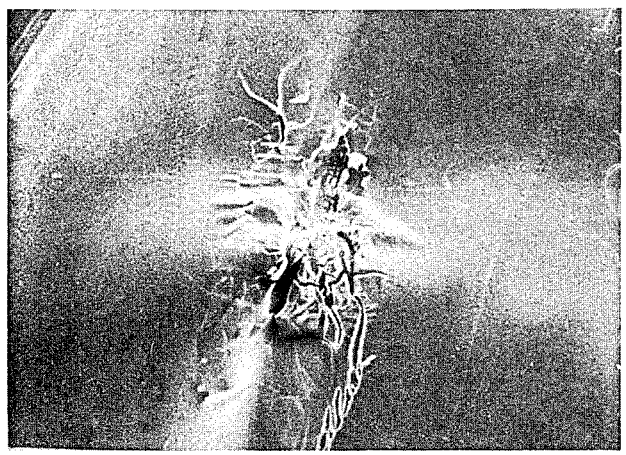
FIG. 7 is a photomicrographic view of the section of casing wall of FIG. 6 magnified 100 times from which the iron particle has been removed and depicting casing degradation.

FIG. 6 is a photomicrographic view of a section of a casing wall magnified 500 times showing an iron particle in contact with the casing wall. FIG. 7 is a photomicrographic view of the section of casing wall of FIG. 6 magnified 100 times from which the iron particle shown in FIG. 6 has been removed. The casing wall depicted in FIG. 6 and FIG. 7 had been treated with liquid smoke derived from the controlled combustion of natural wood and stored for about 3 months when these photomicrographs were taken. The casing wall depicted in FIG. 6 and FIG. 7 had not been treated with an agent to inhibit the formation of discoloration or black spot thereon. As can be seen in FIG. 7, when the iron particle was removed from the casing wall after about 3 months of storage, the casing wall has clearly deteriorated as evidenced by the numerous cracks and fissures therein.

Figure 8:
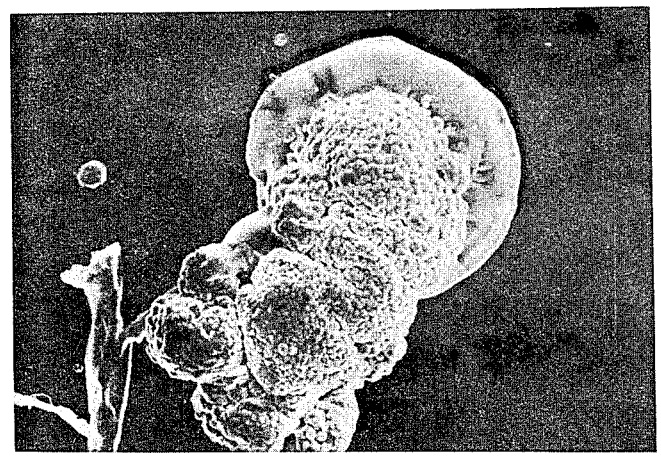
FIG. 8 is a photomicrographic view of a section of a casing wall magnified 200 times depicting an iron particle theron encapsulated by phosphate.
Figure 9:
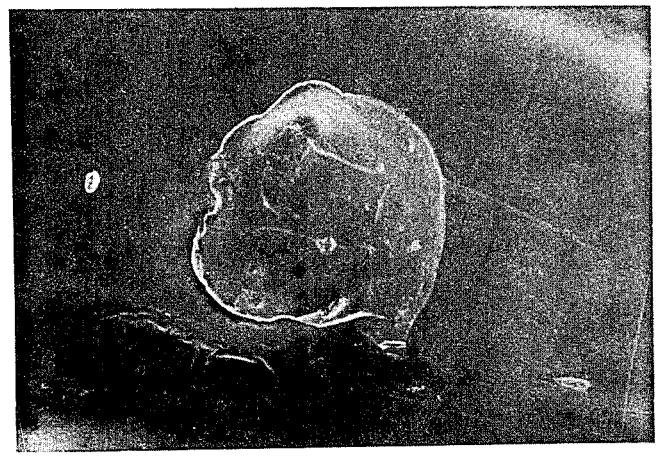
FIG. 9 is a photomicrographic view of the section of casing wall of FIG. 8 magnified 100 times from which the encapsulated iron particle has been removed depicting no casing degradation.

FIG. 8 is a photomicrographic view of a section of a casing wall magnified 200 times showing an iron particle thereon which has been encapsulated by phosphate in accordance with this invention. FIG. 9 is a photomicrographic view of the section of casing wall of FIG. 8 magnified 100 times from which the encapsulated iron particle shown in FIG. 8 has been removed. The casing wall depicted in FIG. 8 and FIG. 9 had been treated with liquid smoke derived from the controlled combustion of natural wood, and also treated with about 0.5 mg. of phosphate per square inch of casing wall which was applied to the casing during the shirring step. The thus-treated casing had been stored for about 3 months when these photomicrographs were taken. It can be seen in FIG. 9 that when the phosphate encapsulated iron particle shown in FIG. 8 was removed from the casing wall after about 3 months of storage, the casing wall shows no evidence of deterioration.

Pursuant to this invention, many metals have been found to react with the smoke solution components in the moist casing environment. Such metals include iron, copper, zinc, nickel, stainless steel having relatively high carbon contents, Monel, Hastalloy, and manganese. Those metals exemplifying non-reactivity include tin, aluminum, and chromium. In most commercial environments the contaminant will be iron. It is believed that the aforementioned black spots are primarily the result of iron ions reacting with phenolic compounds present in the liquid smoke solution and the black spots develop during storage of the casings under humid conditions. The iron source is believed to be contamination from the various casing manufacture process machinery. It is theorized that the black spot mechanism entails a reaction of $Fe^{+3}$ ions with phenols present in the liquid smoke solution and produces the black colored complex. That is, as long as the iron is in its elemental state, $Fe^0$; it does not form black spots. When the iron is oxidized to the $Fe^{+3}$ state, the $Fe^{+3}$ ions begin to migrate into the casing and react with the phenolics present there to form the black spots. When the $Fe^{+3}$ ions are tied up in an insoluble form they are rendered unreactive to the phenolic compounds in the liquid smoke treated casing and do not form black spots. One mechanism is for the iron particles to become encapsulated with an insoluble salt as the ferric ions are formed.

In one mode of this invention, it has been found that the addition of a phosphate radical, such as one from a monobasic phosphate or a dibasic phosphate, into a liquid smoke solution in the amount of between about three percent and about twenty percent by weight, and preferably between about seven percent and about 12 percent by weight, based on the weight of the liquid smoke solution, and treating the food casing with the liquid smoke solution containing the phosphate salt effectively inhibits the formation of black spots and discolorations on the treated casings. Where other inhibiting agents are employed, such as the coordination compounds, the amount present should be about one percent to about twenty percent by weight based on the weight of the liquid smoke solution. It has been found that the presence of the inhibiting agent tends to encapsulate the metallic contaminant particles, thus preventing ionic diffusion sufficiently to thereby suppress a reduction-oxidation reaction of the metal with the phenolic components of the smoke solution and the cellulose of the food casing.

In another mode of this invention, it has been found that the application of between about 0.1 to about 5 mg. of the inhibiting agents herein, per square inch of casing wall of a food casing, effectively inhibits the formation of black spots and discolorations on the treated casings. In this mode, the black spot and discoloration inhibiting agent may be applied to the casing wall prior to, during, or after treating the casing with a liquid smoke composition. However, it is preferred that the inhibiting agent be applied to the casing wall after the casing has been treated with a liquid smoke composition, and such may be accomplished during the casing shirring operation by adding the inhibiting agent to a shirring solution conventionally employed therewith.

The liquid smoke composition employed in the instant invention is preferably one which is derived from the controlled combustion of wood. Typical commercially available liquid wood smoke solutions useful in the instant invention are shown in Table A along with their acid and total solid contents.

TABLE A

| Commercially Available Liquid Wood Smokes | | |
|---|---|---|
| Manufacturers Designation | Total Acid Content (d) Wt. % | Total Solid Wt. % |
| Royal Smoke AA[a] | 11.5–12.0 | 10.2 |
| Royal Smoke A[a] | 10.5–11.0 | 9.0 |
| Royal Smoke B[a] | 8.5–09.0 | 8.8 |
| Royal Smoke 16[a] | 10.0–10.5 | 17.6 |
| Charsol C-12[b] | 12.0–12.5 | 8.3 |
| Charsol C-10[b] | 11.5 | not reported |
| Charsol X-11[b] | 10.0 | 5.8 |
| Charsol C-6[b] | 6.7 | 4.8 |
| Charsol C-3[b] | 3.6 | 1.0 |
| Smokaroma | | |
| Code - 12[c] | 12.0 | 10.5 |
| Code - 10[c] | 10.2 | 5.1 |
| Code - S[c] | 8.0 | 2.4 |
| Code - 6[c] | 6.2 | 1.9 |

[a] Griffith Laboratories, Inc. 12200 South Central Avenue, Alsip, IL
[b] Red Arrow Products Co., P.O. Box 507, Manitowoc, WI
[c] Meat Industry Suppliers, Inc. 770 Frontage Road, Northfield, IL
[d] Also referred to as "Total Acidity"

In one embodiment, the untreated liquid smoke composition used in the practice of this invention has a total acid content of at least 6 weight percent and most preferably a total acid content of at least about 9 weight percent. Total acid content is a qualitative measure of the tar content and staining capability of liquid wood smokes, and it is a measure used by manufacturers. In general, higher total acid content means higher tar content. The same is true of the total solids content of liquid smoke. The procedures used by liquid wood smoke manufacturers to determine total acid content (total acidity) and total solids are as follows:

DETERMINATION OF TOTAL ACID CONTENT FOR LIQUID SMOKE

1. Weigh accurately about 1 ml. of liquid smoke (filtered if necessary) in a 250 ml. beaker.
2. Dilute with about 100 ml. of distilled water and titrate with standard 0.1N NaOH to a pH of 8.15 (pH meter).
3. Calculate the total acid content as percent by weight of acetic acid, using the following conversion:
1 ml. 0.1000N NaOH = 6.0 mg. HAc

DETERMINATION OF TOTAL SOLIDS

1. Pipet about 0.5 ml. of liquid smoke on a tared 6 cm aluminum moisture dish fitted with a dried Whatman No. 40 filter paper disc, and weigh accurately. The liquid smoke should be clear, and filtration is used to insure this condition.

2. Dry for two hours at 105° C. in a forced draft oven, or for 16 hours at 105° C. in a conventional oven.

3. Cool to room temperature in a desiccator and weigh.

4. Calculate the total solids as percent by weight of the liquid smoke.

The liquid smoke composition used in this invention may also contain other ingredients which may be suitably used in treating a tubular food casing, to which the smoke constituents are applied, e.g., glycerine may be used as a softening agent and a humectant. Certain ingredients such as propylene glycol may be added for multiple purposes, e.g. as a softening agent, a humectant, and as an antimycotic agent.

Other ingredients which are normally used in the manufacture of, or for further treatment of the food casings, e.g., peelability agents and mineral oil, may also be present if desired. In particular, agents for improving the peelability of fibrous casings from food products such as hams and sausages, e.g., beef rolls, turkey rolls, bolognas and the like, may be optionally coated on the internal surface of the casings before or after the liquid smoke treatment method of this invention and before or during shirring. Such peelability enhancing agents include, but are not limited to, methyl cellulose, carboxymethyl cellulose and other water soluble cellulose ethers, the use of which is disclosed in U.S. Pat. No. 3,898,348 issued Aug. 5, 1975 to Chiu et al.; "Aquapel", a Hercules, Inc. trademarked product comprising alkyl ketene dimers, the use of which is further disclosed in U.S. Pat. No. 3,905,397 issued Sept. 16, 1975 to H. S. Chiu; and "Quilon", an E. I. duPont de Nemours Co., Inc. trademarked product comprising fatty acid chromyl chlorides, the use of which is further disclosed in U.S. Pat. No. 2,901,358 issued Aug. 25, 1959 to W. F. Underwood et al.

The peelability enhancing agent may be applied to the internal surface of the tubular fibrous casings by using any one of a number of well known methods. Thus, for example, the peelability enhancing agent can be introduced into the tubular casing in the form of a "slug" of liquid, in a manner similar to that disclosed, for example, in U.S. Pat. No. 3,378,379 to Shiner et al. Advancing the casing past the liquid slug coats the inner surface thereof. Alternatively, the peelability enhancing agent may be applied to the internal surface of the fibrous casing through a hollow mandrel over which the casing is advancing as, for example, a shirring machine mandrel in a manner similar to that described in U.S. Pat. No. 3,451,827 to Bridgeford.

It should also be recognized that the liquid smoke impregnated casing article of this invention may be printed with an insignia, trademark or lettering, as for example described in U.S. Pat. No. 3,316,189.

The liquid smoke solution employed in this invention may also comprise a tar-depleted liquid smoke solution which has been produced by the extraction of as-is aqueous liquid smoke with selected organic liquid solvents to form a tar-enriched organic liquid fraction and a tar-depleted aqueous liquid smoke fraction, and separating the tar-depleted aqueous liquid smoke fraction from the tar-enriched organic liquid fraction. In addition, the tar-depleted liquid smoke solution may be obtained by providing a tar-containing liquid smoke solution, partially neutralizing the smoke solution to a pH of at least about 4 to form a tar-enriched fraction and a tar-depleted fraction while controlling the smoke solution temperature during neutralization to under about 40° C. and separating the fractions to recover the tar-depleted fraction. The tar-depleted liquid smoke solution may also be obtained by neutralizing a tar-containing liquid smoke solution to a pH greater than 4 and separating the solution to remove therefrom the precipitated tar. In addition, the liquid smoke solution useful herein may comprise a concentrated liquid smoke solution prepared by concentrating a tar-depleted liquid smoke solution, to a weight of between about one half and about one fifth of the original weight of the tar-depleted liquid smoke solution, by various means such as by evaporation. Where desired, following concentration of the liquid smoke solution, it may optionally be neutralized to any desired pH value by any suitable method, such as by the addition thereto of an alkaline substance such as sodium hydroxide, potassium hydroxide, sodium carbonate, and sodium bicarbonate.

In accordance with this invention, the liquid smoke solution is employed to treat cellulosic food casings to impregnate sufficient liquid smoke components therein to provide an absorptive index thereto of at least about 0.15, preferably at least about 0.4 and most preferably between about 0.4 and about 1.0. For particularly dark color, an impregnated fibrous casing preferably has an absorptive index of at least 1.5. "Absorptive index" is a measure of the casing's ability to impart smoke color to encased foodstuff, and for purposes of this invention is determined by the following procedure:

Absorptive Index

Two square inches of liquid smoke-treated casing are placed in 10 ml. of methanol. After one hour of soaking time, the methanol has extracted all of the smoke components out of the casing, and the ultraviolet absorption value of the resulting smoke component-containing methanol is determined at 340 nm. This value is defined as the absorptive index of the casing. A 340 nm. wave length was selected because spectroscopy measurements with many liquid smoke extracts from smoke treated casings indicate greatest correlation with smoke loading in this region.

When casings with high moisture contents of up to about 40% by weight of water in the total casing weight, are desired for subsequent processing, these casings with high moisture contents may be employed using the liquid smoke impregnated casing of this invention, without fear of black spot formation during normal storage periods, i.e., up to about one year. To attain desired high levels of moisture in the casing at low smoke color levels for the encased foodstuff, a commercially available liquid smoke solution containing a low total acid content and a low total solids content should preferably be used. The reason for this preference is that when a liquid smoke solution containing high total acid and high total solids is diluted with additional water, precipitation of tars from the aqueous liquid smoke solution occurs. Precipitation of tars should be avoided to prevent contamination of processing equipment and discoloration of the food casings.

Manufacturing Methods

The cellulosic casing article of this invention which has been treated so as to inhibit the formation of black spots and discolorations thereon may be provided by a variety of methods. As earlier disclosed, the inhibiting agent may be added to a liquid smoke composition, dissolved therein, and the mixture applied to the casing. In another embodiment, a solution or dispersion of the discoloration inhibiting agent may be prepared and applied to the casing, either before or after applying the liquid smoke composition to the casing. In a preferred embodiment, the discoloration inhibiting agent may be applied to a smoke treated casing during the shirring operation of the casing such as by addition of the inhibiting agent to a shirring solution. In the preferred embodiment, the inhibiting agent may be applied to the external surface of the casing, or it may be applied to the internal surface of the casing along with the shirring solution containing agents for casing shirrability and peelability.

More specifically, the liquid smoke treated fibrous casing article of this invention may be prepared in accordance with the method disclosed by Chiu in U.S. Pat. No. 4,377,606. It is therein described that a wood-derived liquid smoke may be impregnated into a cellulosic casing by providing a cellulosic casing in flattened form and moving the casing through a liquid smoke coating zone to contact at least one outer surface of the flat casing with the liquid smoke under conditions sufficient to coat but not impregnate the casing wall. The liquid smoke coated flat casing is then moved from the coating zone to a reeling zone where it is wound into a rotating roll of overlaying layers under conditions sufficient to trap the liquid smoke coating between adjacent layers of casing in the roll. The liquid smoke coated casing roll is rotated under conditions such that at least a portion of the liquid smoke impregnates each layer or wall of the casing. In this method, the casing discoloration inhibiting agent may be dissolved in the liquid smoke composition and applied to the casing simultaneously with the smoke solution.

A preferred method of preparing the liquid smoke treated cellulosic casing article of this invention is disclosed by Chiu et al in U.S. Pat. No. 4,356,218. Therein described are both an apparatus and a method for coating the exterior wall of a continuous, longitudinally moving, inflated flexible tubing with a liquid composition. In the apparatus aspect of that patent, two flexible and resilient means are provided, each having contact with the exterior wall of an inflated flexible tubing through openings in said means, wherein the openings have slightly smaller diameters than the diameter of the inflated flexible tubing that passes longitudinally through the openings. The first means controls the distribution of a liquid coating composition onto the exterior wall of the tubing. The second means, rotatable around the tubing axis, smooths the applied liquid on the exterior wall of the tubing to produce a film of uniform thickness. In the method aspects of the patent, an inflated flexible tubing is continuously moved in a longitudinal direction along a straight line passing through an opening in a first means which is supplied with a liquid coating composition. Rubbing contact with the opening edge of the first means is maintained so as to distribute the liquid around the inflated tubing exterior wall. The tubing then passes through an opening in a second means which rotates around its centerline axis. Rubbing contact with the opening edge of the second means is maintained which smooths the liquid coating as a continuous film of uniform thickness on the tubing exterior wall.

Another suitable method for applying the liquid smoke to the casing external surface is by roll coating, i.e. printing a film of liquid smoke on at least one surface of a flattened casing with a roll such as an Anilox Roll. In such an operation the flattened casing may be coated on one side or on both sides. Still another method for applying the liquid smoke to the casing surface is by spraying the liquid onto at least one casing surface.

Each of the previously described liquid smoke impregnation methods generally involves external treatment of the casing surface. The treatment could also be internal, as for example, by slugging.

A further possible method for applying the liquid smoke is by either internal or external spraying during shirring of the cellulosic casing into the stick form. A disadvantage with this technique is avoidance of non-uniformity in the smoke coated shirred stick. Assuming the liquid smoke is uniformly applied, care should be taken that the uniform pattern is not disrupted by the casing surface movement during shirring and stick compression.

It is to be noted that the liquid smoke which is coated on the casing surface, whether externally coated or internally coated, does not exist solely as a surface coating. Smoke color, odor and flavor constituents which are coated on the surface penetrate the cellulosic structure of the casing as the cellulose absorbs the moisture of the smoke solution. Inspection of the cross-section of the casing wall discloses a color gradation across the casing wall, with the smoke treated surface having a darker color than the surface on the opposite side of the casing wall.

A consideration in selection of a liquid smoke treatment technique is that the glycerine content of cellulosic casings tends to be leached out of the casing by the liquid smoke if the casing is immersed in a dip tank for a relatively long period. Thus, the contact time should be insufficient for a substantial amount of glycerine leaching to occur. However, where leaching is a problem when the cellulosic casing is immersed in a dip tank for long periods, makeup glycerine should be added to the liquid smoke dip tank to compensate for the leaching loss.

Liquid Smoke Loading

The amount of smoke constituents that will be present in the food casing of the present invention will depend on the desired flavor and/or color characteristics to be imparted to the food products processed therein, and may vary over a wide range. The amount present, therefore, is largely determined by the composition and concentration of smoke constituents in the particular liquid smoke solution initially employed, but, in general, the food casing should have incorporated therein at least about 0.3 mg of smoke coloring and flavoring constituents per square inch of casing surface and preferably at least about 0 8 mg/in$^2$ of smoke constituents. The amount of a salt of an alkaline neutralizing agent, if present, will largely depend on the amount of the alkaline neutralizing agent used to prepare the partially or substantially neutralized liquid smoke solution which was coated on the casing.

A further consideration is that the relationship between smoke color intensity of the outer surface of a foodstuff processed in liquid smoke- impregnated cellulosic casings, and the smoke loading, or casing absorptive index, is not linear. That is, the smoke color intensity increases rapidly at very low smoke loading and absorptive index up to an absorptive index value of about 0.15. At higher absorptive index values, the smoke color intensity increases at significantly lower rates. This means that the practitioner may obtain substantial smoke color on processed food surfaces by using relatively low liquid smoke loadings corresponding to absorptive index values of at least about 0.15 to about 1.0 with nonfibrous cellulose casings, and absorptive index values of between about 0 15 and about 1.5 with fibrous cellulose casings. If deeper smoke color is required with fibrous casings, much higher liquid smoke loadings must be employed which provide higher absorptive index values of 1.5 and above. However, a preferred embodiment of the liquid smoke treated casing article of this invention is a fibrous casing having sufficient liquid smoke loaded therein to provide an absorptive index of between about 0.4 and about 1.0. This particularly preferred range of 0.4 to 1.0 for the absorptive index has been selected because the color is more controllably achieved with reproducible results when casings are used which have smoke loadings sufficient to provide absorptive indices in this range. Those skilled in the art can readily determine the amount of liquid smoke loading, in mg. of liquid smoke solution per square inch of casing surface, required to achieve a desired absorptive index by using a calibration curve for that specific smoke solution.

The acids, phenols and carbonyls present in a cellulosic casing may be determined by removal, using steam distillation from a known area of casing (about 300 inch$^2$). To assure removal, the aqueous bath containing the casing sample is acidified prior to steam distillation. The steam distillate is diluted to a volume of 500 ml prior to analysis. Acids are expressed as acetic acid. Phenols are expressed as 2,6 dimethoxyphenol. Carbonyls are expressed as 2-butanone.

Acids and phenols are determined by the procedures described in the publication S. Simon, et al., *Food Technology*, Vol. 20, No. 11, pp. 114–118 (1966), which procedures are incorporated herein by reference.

Carbonyl compounds present in the steam distillate are determined by reacting a known volume of the distillate with alcoholic 2,4-dinitrophenylhydrazine under acid conditions. The solution is digested at 55° C. for 30 minutes, cooled rapidly, and made basic with alcoholic potassium hydroxide. The solution is shaken and allowed to stand for 30 minutes. The absorbance of the solution is determined at 480 nanometers using a spectrophotometer. The measured absorbance of the solution is compared to the absorbances of a standard curve determined experimentally using 2-butanone. The amount of carbonyl compounds present are then expressed as mg of 2-butanone per inch$^2$ of casing.

For optimum results herein, the liquid smoke treatment of cellulosic casing to prepare the article of this invention is practiced under clean controlled environmental conditions which are as stringent as those normally employed in the preparation of a food manufacturing component. This is an important consideration since metal wear particles (primarily iron, copper, brass) in contact with the casing react with the liquid smoke coating, resulting in auto-oxidation and discoloration of the treated casing. The discoloration occurs primarily in the immediate area of the metal contamination and seldom exceeds 2–10 mm diameter in size. In addition to a clean environment, the materials of construction of the processing equipment should be of high wear resistance and nonreactive with the liquid smoke. It has been determined that certain metals and alloys are compatible with these requirements. These materials include certain aluminums, chrome plating, tin alloys, and hardened stainless steels. Also, of benefit to the metal contamination and discoloration problem is the manufacture of the smoke treated casing in a metal dust-free environment. This means that all machines used in the manufacture must be free of metallic dust, not just the smoke coating system. Also, the casing must be handled and packaged in an environment free of metallic dust.

The following examples are set forth as being merely illustrative of the invention and are not intended, in any manner, to be limitative thereof. Unless otherwise indicated, all parts and percentages are by weight

EXAMPLE I

To determine the propensity of cellulosic and fiber reinforced cellulosic casings for developing black spots, various samples of gel stock, semi-finished flat stock, and shirred casings were examined for the appearance of any discoloration after treatment with liquid smoke solution and storage. The casing samples were dipped in liquid smoke solution for about four minutes to assure adequate absorption of the solution. After dipping and removing excess smoke solution, the samples were bagged, stored, and checked periodically for black spots. Care was taken with each sample to avoid any contamination and rubber gloves were worn when handling the casing samples.

Two types of liquid smoke solution were employed for dipping the samples. Liquid smoke solution A comprised commercially available Royal Smoke AA from Griffith Laboratories, Alsip, Ill., having a pH of about 2.4, a total acid content of between about 11.5 and 12.0, and a total solids of about 10.2%. Liquid smoke solution B comprised Royal Smoke AA which had been tar-depleted by neutralization to a pH of about 6.

With cellulose casings, the majority of spots observed were of the diffuse type with less than 5% being of the intense type. In general, spot development was sporadic on gel stock, flat stock, and shirred sticks. These results indicate that as the casing goes through the various processing steps from extrusion through shirring, its potential for contamination and spot development increases. The fiber reinforced cellulose casings evaluated had substantially fewer spots.

Table 1 summarizes the results of these tests.

TABLE 1

| | Smoke Solution | Feet | Spots | Storage Days |
|---|---|---|---|---|
| *Series 1* | | | | |
| CELLULOSE CASINGS | | | | |
| Flatstock | B | 75 | 2 | 52 |
| Flatstock | A | 75 | 0 | 35 |
| Gelstock | A | 95 | 0 | 35 |
| Shirred Stick | B | 95 | 3 | 52 |
| Shirred Stick | A | 70 | 6 | 35 |
| FIBER REINFORCED CELLULOSE CASINGS | | | | |
| Flatstock | B | 70 | 2 | 52 |
| Flatstock | A | 85 | 0 | 35 |
| *Series 2* | | | | |
| CELLULOSE CASINGS | | | | |
| Flatstock | A | 75 | 0 | 35 |
| Shirred Stick | B | 95 | 4 | 52 |
| Partial Shirred Stick | A | 40 | 8 | 35 |

In Table 1, feet represents the number of feet of casing sample dipped in liquid smoke solution. Spots represents the total number of spots observed on each sample. Storage days represents the number of days from the date of dipping the casing sample in liquid smoke solution to the date of its last evaluation.

EXAMPLE II

Various materials were evaluated for their inhibitory effect in regards to the formation of discolorations and/or black spots on liquid smoke-treated cellulosic food casings. Ten percent aqueous solutions of the materials to be evaluated were prepared. The smoke-treated casing was sprayed with each test solution until the casing surface appeared wet. A few iron filing particles were sprinkled on the casing surface and the casing was covered with plastic to avoid loss of moisture. Within twenty-four hours it was found that the control sample not treated with any discoloration inhibiting agent developed large black spots at the points containing the iron particles. Table 2 summarizes the extent to which the evaluated materials were effective in inhibiting discoloration of the iron particle contaminated casing samples.

TABLE 2

| Material | Effectiveness Rating |
| --- | --- |
| sodium phosphate (p) | very effective |
| sodium hexametaphosphate (p) | very effective |
| sodium hydrogen phosphate (p) | very effective |
| sodium pyrophosphate (p) | very effective |
| sodium citrate (c) | moderately effective |
| sodium tartrate (c) | moderately effective |
| calcium acetate (c) | moderately effective |
| desferric-ferrioxamin (a) | moderately effective |
| ethylene diaminetetraacetate (a) | temporarily very effective |
| sodium hydrosulfite (i) | temporarily very effective |
| ascorbic acid (c) | temporarily moderately effective |
| sodium benzoate (c) | not effective |
| ammonium sulfate (i) | not effective |
| lactic acid (c) | not effective |
| sodium molybdate (i) | not effective |
| potassium sorbate (c) | not effective |
| sorbitol (ch) | not effective |
| galactose (ch) | not effective |
| sorbic acid (c) | not effective |
| urea (a) | not effective |
| sodium bisulfite (i) | not effective |
| xylose (ch) | not effective |
| tannic acid (c) | not effective |
| sodium oleate (c) | not effective |
| salicylic acid (c) | not effective |
| cysteine (a) | not effective |
| sodium oxalate (c) | not effective |
| zinc sulfate (i) | not effective |
| sodium nitrite (i) | not effective |
| butylated hydroxyanisole (ao) | not effective |
| butylated hydroxytoluene (ao) | not effective |
| catechol (o) | not effective |

The types of various materials evaluated are indicated by code letter in parentheses where (p) represents phosphates, (c) represents polycarboxylic acids and salts thereof, (a) represents amines, (ao) represents antioxidants, (ch) represents carbohydrates, (i) represents inorganic salts, and (o) represents other organic compounds.

EXAMPLE III

Ethylene diaminetetraacetate (EDTA) was further evaluated as a discoloration and black spot inhibitor for iron contaminated smoke-treated cellulose casings. EDTA was added to (1) the liquid smoke solution, or (2) the glycerine bath, or (3) the internal shirring solution during three separate runs. In all instances the casings were treated with a tar-depleted liquid smoke neutralized to a pH of about 6, and the casings were seeded with iron powder. After preparation, the casing samples were stored at room temperature and evaluated for discolorations and black spots after various storage periods. Table 3 summarizes the results of this evaluation.

TABLE 3

| Casing Treatment Mode | Black Spots | | | | | |
| --- | --- | --- | --- | --- | --- | --- |
| | 1 week | 2 weeks | 3 weeks | 1 month | 2 months | Burst at spot |
| Control | yes | yes | yes | yes | yes | yes |
| 1% EDTA in liquid smoke solution | no | no | no | yes | yes | yes |
| 1% EDTA in glycerine bath | no | no | no | yes | yes | yes |
| 0.5% EDTA in internal shirring solution | no | no | no | yes | yes | yes |

From the above results, it is seen that while the presence of EDTA, regardless of mode of introduction to the test casings, was initially effective, it appears that as the iron contaminant ionizes with time it eventually overwhelms the chelating capacity of the EDTA and the black spots develop on the casings. After storage for eleven months, the EDTA treated casings exhibited inferior general strength characteristics as illustrated by lower burst pressures, i.e., about 80 percent of acceptable standard, compared with untreated casings, including untreated casings where no black spots were found.

Consequently, it was reasoned that the inhibition of discolorations and black spots on liquid smoke treated cellulosic food casings for a long storage period, e.g., up to about one year, would require an insoluble iron complexing agent which, upon chelation, would stop further ionization and would avoid depletion of the inhibitor with the passage of time.

EXAMPLE IV

This example shows the chemical inactivation of iron ions to inhibit the black spot formation resulting from reaction of the iron ions with the phenolics in liquid smokes. A liquid smoke composition commercially available as Charsol ® C-10 from Red Arrow Products Company, Manitowoc, Wis. was used as the liquid smoke containing active phenolics, and ferric chloride was used as the ionized iron source. After mixing the inhibiting test compound with the liquid smoke, a few drops of ferric chloride were added thereto. In most cases, the mixture turned to a dark or black color with the following exceptions shown in Table 4.

TABLE 4

| Inhibiting Agent | Test Mixture Color |
| --- | --- |
| Sodium Citrate | green |
| Potassium citrate | light brown |
| Ascorbic acid | straw |
| Sodium pyrophosphate | milky white |
| Sodium hexametaphosphate | milky white |
| Sodium hydrosulfite | clear, then darkened (Temporarily Effective) |

EXAMPLE V

This example shows the chemical inactivation of iron ions in cellulose casings treated with wood-derived liquid smoke compositions, to inhibit the black spot formation resulting from reaction of the iron ions with the phenolics in the liquid smokes. In the laboratory tests, a short length of cellulose casing was treated with a smoke solution for one to two minutes, removed therefrom and blotted dry, mounted over supports, and then seeded with iron filings. The casing strips were stored overnight or longer in a saturated humidity environment to observe black spot formation in the seeded areas.

Smoke composition A comprised a tar-depleted liquid smoke solution obtained by providing a tar-containing liquid smoke solution at a temperature below about 40° C., partially neutralizing the smoke solution to a pH of at least about 4 to form a tar-enriched fraction and a tar-depleted fraction while controlling the smoke solution temperature during neutralization to under about 40° C., and separating the fractions to recover the tar-depleted fraction.

Smoke composition B comprised a liquid smoke composition commercially available as Charsol® C-12 from Red Arrow Products Company, Manitowoc, Wis. The results are shown in Table 5.

TABLE 5

| Test Sample | Smoke Solution | Inhibiting Additive | Black Spots | Casing Burst Pressure (mm) |
|---|---|---|---|---|
| 1 | A | none | numerous | not determined |
| 2 | A | excess $Na_2HPO_4$ | none | not determined |
| 3 | B | excess $Na_2HPO_4$ | few | not determined |
| 4 | A | none | pronounced | 270 |
| 5 | A | sodium citrate | less pronounced | 236 |
| 6 | A | $Na_2HPO_4$ | much less pronounced | 352 |

EXAMPLE VI

Based upon the laboratory data of Example V, a commercial casing manufacturing operation was modified by providing for the treatment of the casing with liquid smoke compositions enriched with selected additives, and the treated casings were evaluated. Table 6 illustrates the effect that the additives had upon black spot development and casing degradation. Smoke solutions A and B were the same as in Example V. Smoke solution C comprised a tar-depleted liquid smoke solution which was produced by extracting as-is liquid smoke with selected organic liquid solvents to form a tar-enriched liquid fraction and a tar-depleted aqueous liquid smoke fraction, and separating the tar-depleted aqueous liquid smoke fraction from the tar-enriched liquid fraction. Smoke solution D comprised a concentrated liquid smoke solution prepared from a tar-depleted liquid smoke solution, obtained by a solvent extraction process, which was concentrated by evaporation to a volume of about one fourth of the original volume of the tar-depleted liquid smoke solution. In Table 6, the unit parts of smoke solution and inhibiting additive employed are parts by weight.

TABLE 6

| Test Sample | Smoke Solution (100 parts) | Inhibiting Additive | Black Spots | Casing Burst Pressure (mm) |
|---|---|---|---|---|
| 1 | B | $Na_2HPO_4$ (10 parts) | none | 360 |
| 2 | A | $Na_2HPO_4$ (10 parts) | slight discoloration | 329 |
| 3 | A | Sodium citrate (10 parts) | slight discoloration | 312 |
| 4 | C | $Na_2HPO_4$ (20 parts) | none | not determined |
| 5 | B | $Na_2HPO_4$ (20 parts) | none | not determined |
| 6 | A | $Na_2HPO_4$ (20 parts) | none | not determined |
| 7 | A | none | numerous | not determined |
| 8 | D | $Na_2HPO_4$ (20 parts, not completely dissolved) | numerous | not determined |

It was found that the casing of test samples 1, 2, and 3 had no black spots after one month. However, the casing of test samples 2 and 3 experienced slight discoloration. After five months' storage, the casing of test samples 4, 5 and 6 still had no visible black spots. The casing of test sample 7 had numerous black spots in less than one week of storage. Sample 8 was ineffective because not enough phosphate had been dissolved due to the low water content of the concentrated smoke composition.

EXAMPLE VII

In the preferred embodiment of this invention, phosphate salts are employed in preference to citrate, tartrate and acetate salts due to economics and functionality. As earlier indicated, when adding phosphate to a liquid smoke solution, the type of phosphate added is critical due to its solubility. Optimization of these considerations has led to the addition of between about seven percent and twenty percent of $NaH_2PO_4$, i.e., sodium dihydrogen phosphate, to the liquid smoke, composition. It should be noted that in the casing drying operation, the hygroscopic phosphate salts interfere with the drying process to the extent that the drier heat load is significantly increased. Also, upon storage of the thus treated casings in a moist environment, the casings absorb moisture, become sticky, and are more difficult to shirr. Notwithstanding these drawbacks, phosphate salt is still employed in this invention because phosphate salt treatment of cellulosic casings has been found to be very effective in inhibiting casing discolorations and black spots.

In laboratory tests, a cellulose casing sample (Control A) was treated with the liquid smoke composition A of Example V and another casing sample (Control C) was treated with the liquid smoke composition C of Example VI. Likewise, cellulose casing was treated with the aforementioned liquid smoke compositions A and C each containing ten percent by weight of $NaH_2PO_4$. All the samples were seeded with iron particles, packaged, and stored. Table 7 summarizes the results of these storage tests in terms of casing black spots development.

TABLE 7

| | Black Spots | | | |
|---|---|---|---|---|
| Sample | 1 month | 4 months | 6 months | 9 months |
| A smoke, control | yes | yes | yes | yes |
| C smoke, control | yes | yes | yes | yes |
| A smoke and $NaH_2PO_4$ | no | no | no | no |
| C smoke and $NaH_2PO_4$ | no | no | no | no |

EXAMPLE VIII

Due to the drying difficulties associated with adding phosphate salt via the liquid smoke composition as indicated in Example VII, the phosphate salt was added to the casing via the internal shirring solution. The shirring solution is employed to improve the peelability characteristics of the casings and its composition was as follows:

| Ingredient | % by weight |
|---|---|
| water | 53.36 |
| glycerine | 33.45 |
| Tween 80* | 1.16 |
| mineral oil | 3.70 |
| carboxymethyl cellulose | 0.83 |
| $NaH_2PO_4$ | 7.50 |
| | 100.00 |

*Tween 80 is the commercial tradename for a polyoxyethylene sorbitan ester available from Imperial Chemical Industries.

Samples having phosphate loadings varying from about 0.3 to about 1.0 mg/in² of casing were shirred, then seeded with iron particles and stored. No black spots were found in any treated casings after storage for up to three months. Performance testing of the phosphate treated, liquid smoke-containing casings indicated no adverse effects on the smoke color, flavor or odor imparted to frankfurters processed in the phosphate-treated, smoke-impregnated casings.

It is theorized that the phosphate in the internal shirring solution migrates to the exterior of the shirred "casing stick" during compression of the "casing stick" such that a critical concentration is present on the exterior surface of the casing sufficient to perform the discoloration inhibitor function. The iron seeded particles appear to react with the phosphate, and become encrusted and apparently insulated or encapsulated, thereby preventing further ionization. The encrusted particles can easily be brushed from the casing, leaving no spot or discoloration. Conversely, where no inhibitory treatment is employed, the seeded iron particles ionize completely, eventually dissolving and resulting in the formation of black spots on the casings, and degradation of the casings.

EXAMPLE IX

A standard absorbance curve for the determination of phosphate content as $NaH_2PO_4$ on cellulose casings was developed employing a spectrophotometer set at 863 nm. Three foot samples of cellulose casings available from Union Carbide Corporation, Danbury, Conn., as Nojax which had been smoke-treated, but had not been phosphate-treated were extracted with about 300 ml of water. Various amounts of $NaH_2PO_4$, as indicated below, were added to the extracts. 1.0 ml of phosphated extracts was added to test tubes containing 5.0 ml each of 0.04 molar $(NH_4)_6Mo_7O_{24}\cdot 4H_2O$ and 0.02 molar ascorbic acid solutions. A blank sample, i.e., without extract, was also prepared. All the test tubes were placed in a boiling water bath for about 30 minutes. After cooling, 1.0 ml of each phosphate-containing extract sample was diluted with 10.0 ml of deionized water and run against the diluted blank at 863 nm. The absorbance values were recorded. Table 8 summarizes the sample solutions and absorbance values.

TABLE 8

| Sample No. | Mg of $NaH_2PO_4$ | Mg/ml of $NaH_2PO_4$ | Absorbance |
|---|---|---|---|
| 1 | 120 | .4 | .717 |
| 2 | 108 | .36 | .681 |
| 3 | 96 | .32 | .574 |
| 4 | 84 | .28 | .543 |
| 5 | 72 | .24 | .470 |
| 6 | 60.8 | .203 | .370 |
| 7 | 50.5 | .168 | .321 |
| 8 | 37.6 | .125 | .238 |
| 9 | 25.4 | .085 | .153 |
| 10 | 13.3 | .044 | .076 |

FIG. 5 depicts the standard absorbance curve constructed from the foregoing results. To test a piece of unknown phosphate-treated casing, extract a three foot sample in 300 ml of water. The extract is analyzed for phosphate content using the standard procedure. The casing phosphate loading may be calculated by dividing the extracted phosphate content by the total area of the casing sample.

EXAMPLE X

It has been shown that ferrous, i.e., $Fe^{+2}$, ions do not react with the components of the liquid smoke solutions and only upon their further oxidation to ferric, i.e., $Fe^{+3}$, ions does the reaction proceed. Therefore, use of a gaseous reducing environment was evaluated as a mode of blocking formation of the black spots upon cellulose casings.

Two caddies, each containing 5,000 feet of size 25 cellulosic casing treated with tar-depleted liquid smoke solution per the method described in U.S. Pat. No. 4,356,218, were prepared. Both caddies were seeded with iron filings. One caddy was packaged and stored in a normal warehousing environment. The other caddy was flushed twice with sulfur dioxide ($SO_2$), sealed, and placed in a separate bag. The bag was inflated with sulfur dioxide, thus providing an additional reservoir of sulfur dioxide. After one month of storage, the control caddy had numerous black spots, while the sulfur dioxide treated sample evidenced no black spots. The seeded iron particles were very black, but could easily be brushed free from the casing, leaving no permanent black spot thereon.

The caddy samples were further stored and evaluated for the presence of black spots and for burst strength. After three months of storage, no black spots were visually apparent on the sulfur dioxide treated sample, and its burst pressure was found to meet quality standards. The control sample exhibited numerous black spots, and while breaks at the black spots were not sub-standard, such breaks indicated casing deterioration.

Stuffing performance evaluation of the three month old casing samples indicated that the sulfur dioxide did not alter the smoke coloring and flavoring constituents of the liquid smoke composition. The odor of sulfur dioxide was prevalent when the shirred casings were removed from the package. Other less odiferous gases were also evaluated as herein, including carbon dioxide, oxygen, nitrogen, and hydrogen. None of these latter gaseous environments had a beneficial effect in blocking the oxidation of the iron contaminant in the moist casing environment. That is, only sulfur dioxide was found to be effective, even though nitrogen and hydrogen are generally employed for reducing applications.

EXAMPLE XI

Liquid smoke treated fibrous reinforced casing prepared in accordance with the method. described by H. S. Chiu in U.S. Pat. No. 4,377,606 was cut into sample pieces having a length of about 12 inches. These samples were employed to determine which metals of construction would react with the liquid smoke components and result in casing discoloration. Metal filings, which were either prepared in the laboratory or were purchased powders, were used to seed the casing samples. In order to accelerate the test, the seeded casings were moistened with a water mist and covered to prevent moisture loss which would retard the oxidation and subsequent reaction with the phenolic constituents of the liquid smoke composition. Table 9 summarizes the seeded metals and casing visual observations made after about 72 hours.

TABLE 9

| Sample No. | Seeded Metal | Casing Visual Observation |
|---|---|---|
| 1 | brass | extensive discoloration |
| 2 | tin | no discoloration |
| 3 | iron | extensive discoloration |
| 4 | copper | extensive discoloration |
| 5 | manganese | extensive discoloration |
| 6 | nickel | extensive discoloration |
| 7 | aluminum | no discoloration |
| 8 | chromium | no discoloration |
| 9 | lead | extensive discoloration |
| 10 | zinc | moderate discoloration |
| 11 | 304 stainless steel | moderate discoloration |
| 12 | 316 stainless steel | moderate discoloration |
| 13 | Monel | extensive discoloration |
| 14 | Hastalloy | extensive discoloration |
| 15 | ferric oxide (pure) | no discoloration |

Samples that did not indicate reaction were retained for 7 days and no further reaction was observed at that time. Pure ferric oxide having already oxidized prior to seeding was inert, possibly due to its insoluble character thus precluding reaction with the smoke components.

EXAMPLE XII

In order to evaluate the effectiveness of phosphate in retarding oxidation and subsequent raaction of liquid smoke constituents with metals other than iron, a test was performed with liquid smoke treated fibrous casing, and liquid smoke treated fibrous casing containing a loading of approximately 1 mg./in$^2$ of $NaH_2PO_4$. Casing samples were seeded with brass, iron, aluminum, and 304 stainless steel filings. As in Example XI, to accelerate the test, the seeded casing samples were moistened with a water mist and covered to prevent moisture loss. Table 10 summarizes the visual observations made on the casing samples after about 3 days.

TABLE 10

| Casing Sample No. | Seeded Metal | Casing Observation — No Phosphate | Casing Observation — Phosphate |
|---|---|---|---|
| 1 | aluminum | no discoloration | no discoloration |
| 2 | brass | extensive discoloration | no discoloration |
| 3 | 304 stainless steel | moderate discoloration | no discoloration |
| 4 | iron | extensive discoloration | slight discoloration |
| 5 | copper | extensive discoloration | no discoloration |

The iron seeded sample (No. 4) had been seeded with a great abundance of metal particles and as noted, some very slight discoloration was observed on the casing. Thus, presumably for this excessive quantity of metal contamination, higher phosphate loadings would be required to control casing discoloration. However, metal contaminations of the extent to which these samples were subjected are excessive and unreasonable in comparison to commercially experienced contamination. The high metal contamination used in this example merely serves as an easily discernible screening procedure.

In accordance with this invention, the food casings of the present invention may preferably be provided in the form of shirred casing sticks, although the casings of this invention may also be provided in the form of flat stock casing. Such casings may be stored for extended periods of time in smoke impermeable packaging without being structurally degraded or deteriorated by chemical action of the coating and, when employed in the processing of a wide variety of food products, such casings will impart smoke flavor and color to the food products without the need for other well known smoking procedures.

Any one of a number of conventional methods and apparatus known for shirring tubular casing to prepare shirred casing sticks may be employed, such as those disclosed in, but not limited to, U.S. Pat. Nos. 2,819,488; 2,984,574; 2,983,949; 3,097,393; and 3,110,058.

In practice, tubular casings of lengths ranging from about 40 to 175 feet or more are shirred and compressed to produce what is commonly termed in the art as "shirred casing sticks or strands" of from about 8 inches to 27 inches in length.

After the shirred casing sticks are prepared, they are packaged and shipped to a food processor, where individual sticks of casing are placed, typically without prior water soaking, on the stuffing horns and stuffed with food emulsion, thereby filling the casing to its fully extended length and recommended stuffed diameter. The stuffed casings are often linked or clipped or tied, but they may be unlinked These encased food products are then subjected to processing by conventional methods, which are generally determined by the type of encased food product, without the need for a conventional smoke treatment. Smoke color, odor, and flavor transfers from the casing to the encased food product during the processing thereof, and smoke color forms on the surface of the food product during processing due to the reaction of smoke constituents with proteins in the food product.

The foregoing description of the present invention is to be taken as being illustrative and not in any sense of limitation, the limits of our invention being defined by the following claims:

We claim:

1. A method for inhibiting discoloration and the formation of black spots upon a cellulose food casing treated with a liquid smoke solution derived from natural wood and containing smoke color, odor and flavor constituents, said method comprising contacting said casing with an agent having the ability to prevent the progressive oxidation of metals, said agent being selected from the group consisting of a coordination compound and a reducing agent, wherein said reducing agent is selected from the group consisting of hydrogen sulfide, sulfur dioxide, and sodium hydrosulfite.

2. A method according to claim 1 wherein said agent is a reducing agent.

3. A method according to claim 1 wherein said agent is a coordination compound.

4. A method according to claim 3 wherein said coordination compound is selected from the group consisting of chelating agents and sequestering agents.

5. A method according to claim 3 wherein said coordination compound is an inorganic material.

6. A method according to claim 5 wherein said inorganic material is a condensed polyphosphate.

7. A method according to claim 6 wherein said condensed polyphosphate is selected from the group consisting of pyrophosphates, metaphosphates, and tripolyphosphates.

8. A method according to claim 5 wherein said inorganic material is selected from the group consisting of monobasic phosphate and dibasic phosphate.

9. A method according to claim 5 wherein said inorganic material is present in an amount of between about three percent and about twenty percent by weight based on the weight of said liquid smoke solution.

10. A method according to claim 5 wherein said inorganic material is present in an amount of between about seven percent and about twelve percent by weight based on the weight of said liquid smoke solution.

11. A method according to claim 3 wherein said coordination compound is an organic material 12. A method according to claim 11 wherein said organic material is selected from the group consisting of amino polycarboxylic acids, hydroxy carboxylic acids, and their salts.

13. A method according to claim 11 wherein said organic material is selected from the group consisting of ethylenediaminetetraacetic acid, diethylenetriaminepentaacetic acid, and their salts.

14. A method according to claim 11 wherein said organic material is selected from the group consisting of citric acid, tartaric acid, and their salts.

15. A method according to claim 11 wherein said coordination compound is present in an amount of between about one percent and about twenty percent by weight based on the weight of said liquid smoke solution.

16. A method according to claim 1 wherein said liquid smoke solution comprises a tar-depleted liquid smoke solution.

17. A method according to claim 16 wherein said tar-depleted liquid smoke solution is produced by extraction of an as-is aqueous liquid smoke solution with an organic liquid solvent to form a tar-enriched organic liquid fraction and a tar-depleted aqueous liquid smoke fraction, and said tar-depleted fraction is separated from said tar-enriched fraction.

18. A method according to claim 16 wherein said tar-depleted liquid smoke solution is obtained by providing a tar-containing aqueous liquid smoke solution, partially neutralizing said solution to a pH of at least about 4 to form a tar-enriched fraction and a tar-depleted fraction while controlling the temperature of said solution during neutralization to a temperature not exceeding 40° C., and separating the fractions to recover said tar-depleted fraction.

19. A method according to claim 16 wherein said tar-depleted liquid smoke solution is obtained by neutralizing a tar-containing aqueous liquid smoke solution to a pH greater than 4 and filtering said solution to remove therefrom the resulting precipitated tar.

20. A method according to claim 1 wherein said liquid smoke solution comprises a concentrated liquid smoke solution prepared from a tar-depleted aqueous liquid smoke solution obtained by concentrating said tar-depleted solution to a weight of between about one half and about one fifth of the original weight of said tar-depleted solution.

21. A method according to claim 1 including contacting said casing with an agent for improving the peelability of said casing.

22. A method according to claim 1 wherein said agent has the ability to prevent the progressive oxidation of iron to the ferric state.

23. A method according to claim 1 wherein said agent is present on said food casing in an amount of between about 0.1 to about 5 mg. per square inch of said food casing.

24. A method according to claim 1 wherein said casing is a non-fibrous casing.

25. A method according to claim 1 wherein said casing is a fibrous casing.

26. A method according to claim 1 including shirring said casing.

27. A method acording to claim 1 wherein said casing is contacted with said agent prior to treating said casing with said liquid smoke solution.

28. A method according to claim 1 wherein said casing is contacted with said agent after treating said casing with said liquid smoke solution.

29. A method according to claim 1 wherein said casing is contacted with said agent while treating said casing with said liquid smoke solution.

30. A method according to claim 1 wherein said casing is contacted with said agent while shirring said casing.

31. A method according to claim 1 wherein said casing is contacted with said agent on the external surface of said casing.

32. A method according to claim 1 wherein said agent is added to said liquid smoke solution employed to treat said casing.

* * * * *